G. HONOLD.
INSULATION OF WINDINGS IN ELECTRICAL APPARATUS.
APPLICATION FILED OCT. 18, 1909.

1,011,791. Patented Dec. 12, 1911.

WITNESSES
INVENTOR
ATTORNEYS

UNITED STATES PATENT OFFICE.

GOTTLOB HONOLD, OF STUTTGART, GERMANY, ASSIGNOR TO THE FIRM OF ROBERT BOSCH, OF STUTTGART, GERMANY.

INSULATION OF WINDINGS IN ELECTRICAL APPARATUS.

1,011,791.  Specification of Letters Patent.  Patented Dec. 12, 1911.

Application filed October 18, 1909. Serial No. 523,326.

*To all whom it may concern:*

Be it known that I, GOTTLOB HONOLD, engineer, a subject of the German Emperor, residing at 11–13 Hoppenlanstrasse, Stuttgart, Germany, have invented certain new and useful Improvements in the Insulation of Windings in Electrical Apparatus; and I do hereby declare the following to be a full, clear, and exact description of the invention, such as will enable others skilled in the art to which it appertains to make and use the same.

This invention relates to the insulation of windings in electrical apparatus, more especially those which have to carry high tension current and are used in the armatures of magneto-ignition apparatus or in spark inductors. The several layers of such coils have been provided with double layers of insulation extending to the middle alternately, in order to protect from perforation those windings which have a greater potential difference than the adjacent layer. Furthermore, for the same purpose the separate layers have been subdivided into several sections separated from each other by layers of insulation; thus, after winding one section, a strip of insulating material of the whole width of the bobbin is wound, and the next section is then wound. In this case smooth layers alternate regularly with the sectional layers so that in separating the sectional layers into two sections there were at the most two layers of insulation, with three sections, three layers and so on; in general, with $n$ sections $n$ layers.

Figure 1:
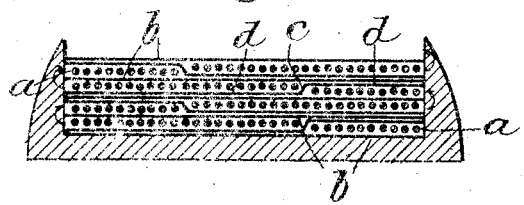
Figure 2:
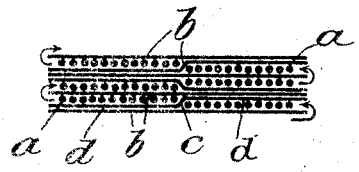
Figure 3:
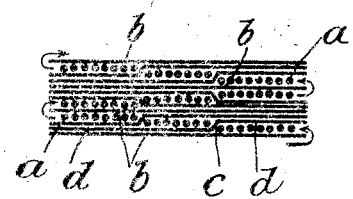
Figure 4:
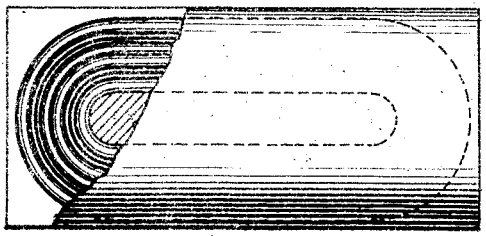

In the accompanying drawings showing several modifications in accordance with my invention, Figure 1 is a half section of an insulated winding applied, for example, to the armature core of a magneto-electric machine; Figs. 2 and 3 show modifications of the winding of Fig. 1; and Fig. 4 is an end view, partly broken away, of Fig. 1; as will be described more fully hereinafter.

The layers $a$ of the winding are separated by flat insulating strips $b$. The other insulating strips consist of flat portions $d$ connected by upstanding portions $c$ which subdivide each layer into sections as shown. In this way each layer is subdivided into sections in such manner that the subdivisions of any one layer progressively rise in a direction opposite to that of adjacent layers.

The invention consists in subdividing each layer of the winding into sections and separating these by layers separated from each other by layers of insulating material in such a manner that, as in Fig. 1 of the accompanying drawings, with two sections there are three at the point where the potential difference between the windings of two neighboring layers is greatest, and successively two layers of insulating material and one where the potential difference does not call for more. Or else as in Fig. 2, with two sections there are three layers and then one or as in Fig. 3 with three sections five layers, and so on; in general, with $n$ sections there are $2_{n-1}$ layers. This is effected by staggering the sections and causing alternately one layer to rise toward the right, the next toward the left. If an equal insulation value is to be secured in the first named construction, a five-fold subdivision of the layers in question must be made so as to obtain five layers of insulation as a maximum. This would obviously considerably increase the difficulty of manufacture. As stated, the advantage of the present invention resides in the fact that with an equal number of transverse subdivisions at the place which is to be protected there is greater insulation value, or with the same insulation value there are fewer sections than in the known method of construction.

Having now particularly described and ascertained the nature of my said invention and in what manner the same is to be performed, I declare that what I claim is:

1. In a winding for electrical apparatus, a plurality of layers of wire, a plurality of flat insulating strips separating adjacent layers, and other insulating strips each comprising two flat portions connected by an upstanding portion, each of said layers being subdivided into sections by said upstanding portions, and adjacent layers being further separated at the places of higher potential difference by said flat portions.

2. In a winding for electrical apparatus, a plurality of layers of wire, a plurality of flat insulating strips separating said layers and other insulating strips subdividing each layer into sections in such manner that the sections of any one layer progressively rise in a direction opposite to that of adjacent layers, whereby adjacent layers are separated by more insulating strips at the places of higher potential difference.

In testimony whereof I have affixed my signature, in presence of two witnesses.

GOTTLOB HONOLD.

Witnesses:
ERNST ULMER,
MAX ANSCHÜTZ.

---

Correction in Letters Patent No. 1,011,791.

It is hereby certified that in Letters Patent No. 1,011,791, granted December 12, 1911, upon the application of Gottlob Honold, of Stuttgart, Germany, for an improvement in "Insulation of Windings in Electrical Apparatus," an error appears in the printed specification requiring correction as follows: Page 1, line 71, for the symbol "$2_{n-1}$" read $2n-1$; and that the said Letters Patent should be read with this correction therein that the same may conform to the record of the case in the Patent Office.

Signed and sealed this 16th day of January, A. D., 1912.

[SEAL.]

C. C. BILLINGS,

*Acting Commissioner of Patents.*